United States Patent
Watanabe et al.

(10) Patent No.: US 6,721,653 B2
(45) Date of Patent: Apr. 13, 2004

(54) NAVIGATION SYSTEM, METHOD, AND PROGRAM FOR AUTOMOTIVE VEHICLE

(75) Inventors: Masaki Watanabe, Yokohama (JP); Takeshi Oono, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 29 days.

(21) Appl. No.: 10/234,473

(22) Filed: Sep. 5, 2002

(65) Prior Publication Data

US 2003/0055558 A1 Mar. 20, 2003

(30) Foreign Application Priority Data

Sep. 17, 2001 (JP) .......................................... 2001-281048

(51) Int. Cl.$^7$ ............................................... G01C 21/50
(52) U.S. Cl. ...................... 701/208; 701/200; 73/178 R; 340/995.14; 340/995.22
(58) Field of Search ................................. 701/208, 200, 701/201, 209, 211; 73/178 R; 340/995.14, 995.22

(56) References Cited

U.S. PATENT DOCUMENTS 6,401,035 B2 * 6/2002 Jin .............................. 701/213
6,636,805 B1 * 10/2003 Tada et al. ................... 701/209
6,654,681 B1 * 11/2003 Schmidt et al. ............. 701/117

FOREIGN PATENT DOCUMENTS

JP                11-213289          8/1999

* cited by examiner

*Primary Examiner*—William A. Cuchlinski, Jr.
*Assistant Examiner*—Olga Hernandez
(74) *Attorney, Agent, or Firm*—McDermott, Will & Emery

(57) ABSTRACT

In navigation system, method, and program for an automotive vehicle, a travel history of the vehicle which is made correspondent with a road map information is stored, a degree of a user's familiarity with one of predetermined regions for each of the predetermined regions in the road map information is calculated on the basis of the travel history of the vehicle and its corresponding road map information, and the road map information is produced in accordance with the calculated degree of the user's familiarity with the one of the predetermined regions.

18 Claims, 8 Drawing Sheets

FIG.4

| ROAD INTERVAL | TRAVEL NUMBER OF TIMES | TRAVELING SPEED | ROAD INTERVAL DISTANCE | ROAD CLASS | To,Do,Fu, AND PREFECTURES | CITY, WARD, AND DISTRICT | WARD, TOWN, AND VILLAGE | TOWN, VILLAGE, AND VILLAGE SECTION | AREA CODE |
|---|---|---|---|---|---|---|---|---|---|
| S1 | 19 | 35km/h | 312m | NATIONAL ROAD | A-PREFECTURE | B-CITY | C-WARD | D-TOWN | 0041 |
| S2 | 8 | 31km/h | 128m | NATIONAL ROAD | A-PREFECTURE | B-CITY | C-WARD | D-TOWN | 0042 |
| S3 | 8 | 31km/h | 115m | NATIONAL ROAD | A-PREFECTURE | B-CITY | C-WARD | E-TOWN | 0051 |
| S4 | 5 | 36km/h | 206m | NATIONAL ROAD | A-PREFECTURE | B-CITY | C-WARD | E-TOWN | 0052 |
| S5 | 0 | – | 247m | NATIONAL ROAD | A-PREFECTURE | B-CITY | C-WARD | E-TOWN | 0053 |
| S6 | 16 | 38km/h | 212m | NATIONAL ROAD | A-PREFECTURE | B-CITY | C-WARD | D-TOWN | 0043 |
| S7 | 8 | 31km/h | 172m | NATIONAL ROAD | A-PREFECTURE | B-CITY | C-WARD | D-TOWN | 0044 |
| S8 | 8 | 31km/h | 96m | NATIONAL ROAD | A-PREFECTURE | B-CITY | C-WARD | E-TOWN | 0054 |
| S9 | 5 | 36km/h | 149m | NATIONAL ROAD | A-PREFECTURE | B-CITY | C-WARD | E-TOWN | 0055 |
| S10 | 0 | – | 130m | NATIONAL ROAD | A-PREFECTURE | B-CITY | C-WARD | E-TOWN | 0056 |
| S11 | 0 | – | 266m | PRINCIPAL LOCAL ROAD | A-PREFECTURE | B-CITY | C-WARD | D-TOWN | 0045 |
| S12 | 11 | 38km/h | 548m | PRINCIPAL LOCAL ROAD | A-PREFECTURE | B-CITY | C-WARD | D-TOWN | 0046 |
| S13 | 3 | 18km/h | 225m | PRINCIPAL LOCAL ROAD | A-PREFECTURE | B-CITY | C-WARD | D-TOWN | 0047 |
| S14 | 3 | 18km/h | 88m | GENERAL ROAD | A-PREFECTURE | B-CITY | C-WARD | E-TOWN | 0057 |
| S15 | 0 | – | 135m | GENERAL ROAD | A-PREFECTURE | B-CITY | C-WARD | E-TOWN | 0058 |
| S16 | 3 | 23km/h | 273m | GENERAL ROAD | A-PREFECTURE | B-CITY | C-WARD | E-TOWN | 0059 |
| S17 | 0 | – | 347m | GENERAL ROAD | A-PREFECTURE | B-CITY | C-WARD | E-TOWN | 0050 |

住所を都道府県名から入力してください
(PLEASE INPUT ADDRESS FROM To,Do,Fu, OR PREFECTURE NAME.)

例：神奈川県足柄下郡箱根町仙石原
(EXAMPLE : SENGOKUBARA HAKONE-CHO ASHIGARASHIMO-GUN KANAGAWA PREFECTURE)

ワンポイントヒント：
よく行かれる場所は直接入力
することもできます。

(ONE POINT HINT :
A LOCATION TO WHICH YOU OFTEN GO
CAN DIRECTLY BE INPUTTED.)

NAVIGATION SYSTEM, METHOD, AND PROGRAM FOR AUTOMOTIVE VEHICLE

BACKGROUND OF THE INVENTION

1. Field of the Invention

The present invention relates to navigation system, method, and program for an automotive vehicle, particularly, relates to navigation system, method, and program therefor in which an object of a search is, with a degree of familiarity of a user (or each user) of the vehicle with a predetermined region, so-called, a plenty knowledge of the predetermined region that the user has can sufficiently be reflected on the search for the object.

2. Description of the Related Art

A Japanese Patent Application First Publication No. Heisei 11-213289 published on Aug. 6, 1999 exemplifies a previously proposed navigation system utilizing a degree of familiarity of a user with a particular region, so-called, a plenty knowledge of the particular region that the user has. In the previously proposed navigation system, a wide-area road network is used to search for an object in a case where the user has no knowledge of the particular region and a detailed road network is used to search the object in a case where the user has a good knowledge of the particular region, thus the search being carried out in accordance with the degree of familiarity with the region that the user has. Consequently, any one of the roads having the degree of detail in accordance with the road knowledge of the user is searched and produced to the user.

The previously proposed navigation system determines whether the user knows an indication point that the user has specified depending upon such an information that whether the indication point that the user has specified is a user's house, a user's place of employment, or a surrounding to a location that the user has specified or whether the indication point is on a road where a number of times the vehicle has passed therethrough has reached to a predetermined value or more within a predetermined interval of time or within a predetermined traveled distance, acknowledges the degree of familiarity of the user according to this determination and carries out the search of the route of travel in accordance with the acknowledged degree of familiarity of the user.

SUMMARY OF THE INVENTION

However, in a case where the degree of familiarity of the user by two determination methods described above is acknowledged, it is necessary for the user to sequentially input and set the information on a location that the user is familiar with and this gives a large burden to the user in a case where the former method is used. On the other hand, in the case of the latter method, although the degree of familiarity of the user can automatically be calculated, the degree of familiarity of the user can be determined from a positional relationship between each particular road segment and the indication point. Hence, although, in the latter determination method, it can be acknowledged that the user is familiar with the road described above, it is not proper to acknowledge that the user is familiar with the region including the road described above.

For example, in a given region in which there are four road segments: (1) a first road segment (interval) which runs from a point of place A to a point of place M via intersections C, E, and I; (2) a second road segment which runs from a point of place B to a point of place K via intersections C and G; (3) a third road segment which runs from a point of place D to a point of place L via intersections E and H; and (4) a fourth road segment which runs from a point of place F to a point of place J via intersections G, H, and I.

Then, suppose that the user has hardly passed through the third road segment but has passed through the first, second, and fourth road segments several number of times. This user has a good knowledge of most roads with the region and the previously proposed navigation system should acknowledge that the degree of familiarity on the region is high (the user has good knowledge of this region). However, the previously proposed navigation system would acknowledge that the degree of familiarity with this region is low when the user specifies a point of place P, point of place P being located along or near a road segment between intersection H and point of place L of the third road segment and would search for the route of travel using the wide-area road network, determining that the degree of familiarity is low.

It is, hence, an object of the present invention to provide navigation system, method, and program for an automotive vehicle which are capable of accurately acknowledging the degree of familiarity of a user of the vehicle with each of predetermined regions and which are capable of sufficiently reflecting the user's degree of familiarity therewith on a search of an object.

The above-described object can be achieved by providing navigation system for an automotive vehicle, comprising: a storing section that stores therein a travel history of the vehicle which is made correspondent with a road map information; a calculating section that calculates a degree of familiarity with one of predetermined regions for each of the predetermined regions in the road map information on the basis of the travel history of the vehicle and its corresponding road map information; and an information producing section that produces the road map information in accordance with the degree of familiarity with the one of the predetermined regions calculated by the calculating section.

The above-described object can also be achieved by providing a navigation system for an automotive vehicle, comprising: a storing section that stores therein a travel history of the vehicle for each of users of the vehicle which is made correspondent with a road map information; a calculating section that calculates a degree of familiarity of one of the users with one of predetermined regions for each of the predetermined regions in the road map information on the basis of the travel history of the one of the users of the vehicle and its corresponding road map information; and an information producing section that produces the road map information in accordance with the degree of familiarity of the one of the users of the vehicle with the one of the predetermined regions calculated by the calculating section.

The above-described object can also be achieved by providing a navigation method for an automotive vehicle, comprising: storing a travel history of the vehicle which is made correspondent with a road map information; calculating a degree of familiarity with one of predetermined regions for each of the predetermined regions in the road map information on the basis of the travel history of the vehicle and its corresponding road map information; and producing the road map information in accordance with the degree of familiarity with the one of the predetermined regions calculated by the calculating section.

The above-described object can also be achieved by providing a navigation program for an automotive vehicle, comprising: a storing function to store a travel history of the vehicle which is made correspondent with a road map information; a calculating function to calculate a degree of familiarity with one of predetermined regions for each of the predetermined regions in the road map information on the basis of the travel history of the vehicle and its corresponding road map information; and an information producing function to produce the road map information in accordance with the degree of familiarity with the one of the predetermined regions calculated by the calculating section.

This summary of the invention does not necessarily describe all necessary features so that the invention may also be a sub-combination of these described features.

BRIEF DESCRIPTION OF THE DRAWINGS

FIG. 4 is an explanatory view representing an example of a travel history and road map information, both pieces of information being stored to make correspondent with each other.

DETAILED DESCRIPTION OF THE PREFERRED EMBODIMENTS

Reference will hereinafter be made to the drawings in order to facilitate a better understanding of the present invention.

Figure 1:
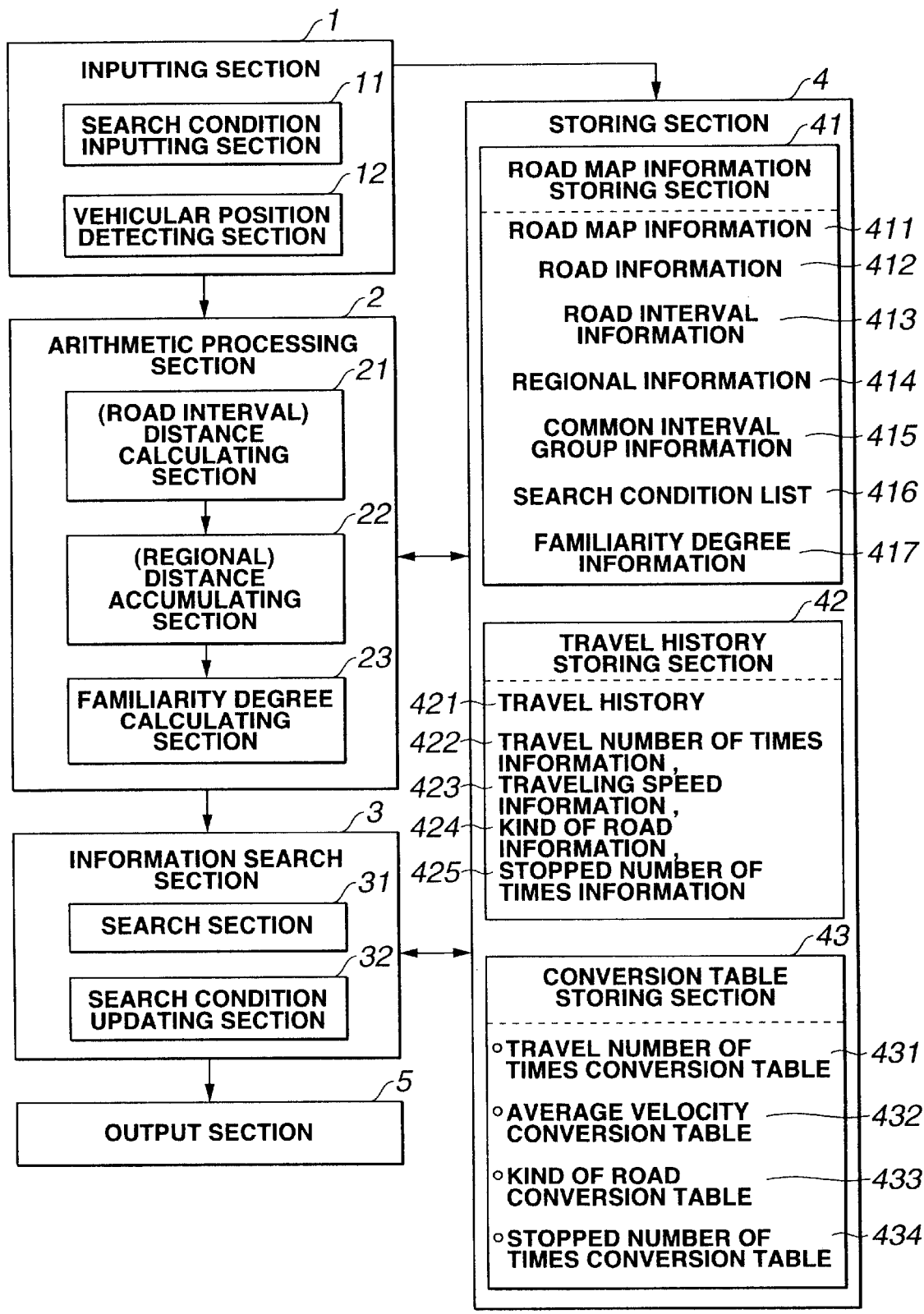
FIG. 1 is a circuit block diagram of a navigation system in a first preferred embodiment according to the present invention.
Figure 2A:
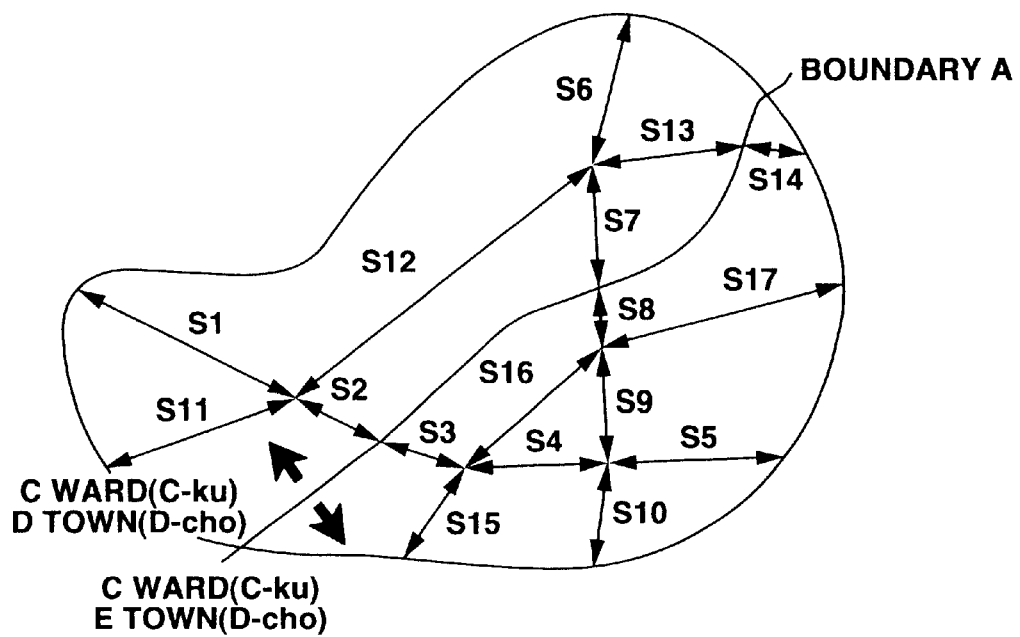
FIG. 2A is an explanatory view of an example of a road map information used in the navigation system shown in FIG. 1.
Figure 2B:
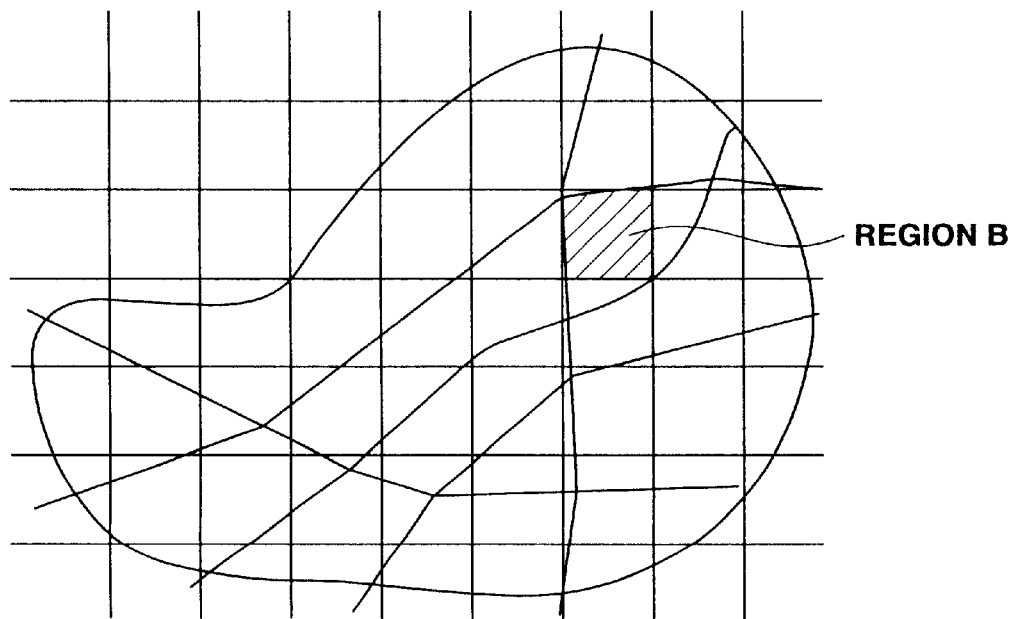
FIG. 2B is an explanatory view of another example of the road map information used in the navigation system shown in FIG. 1.
Figure 3:
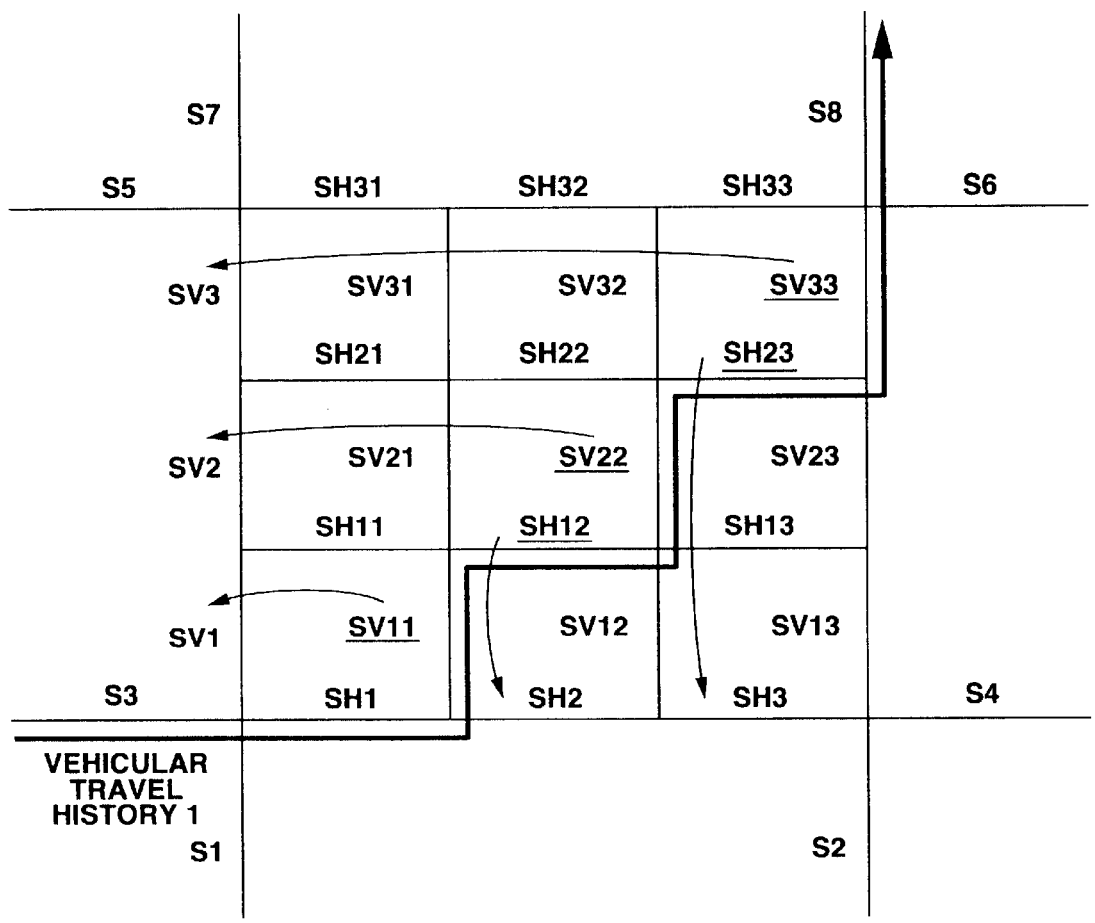
FIG. 3 is an explanatory view for explaining a common interval group on the road map information.
Figure 5:
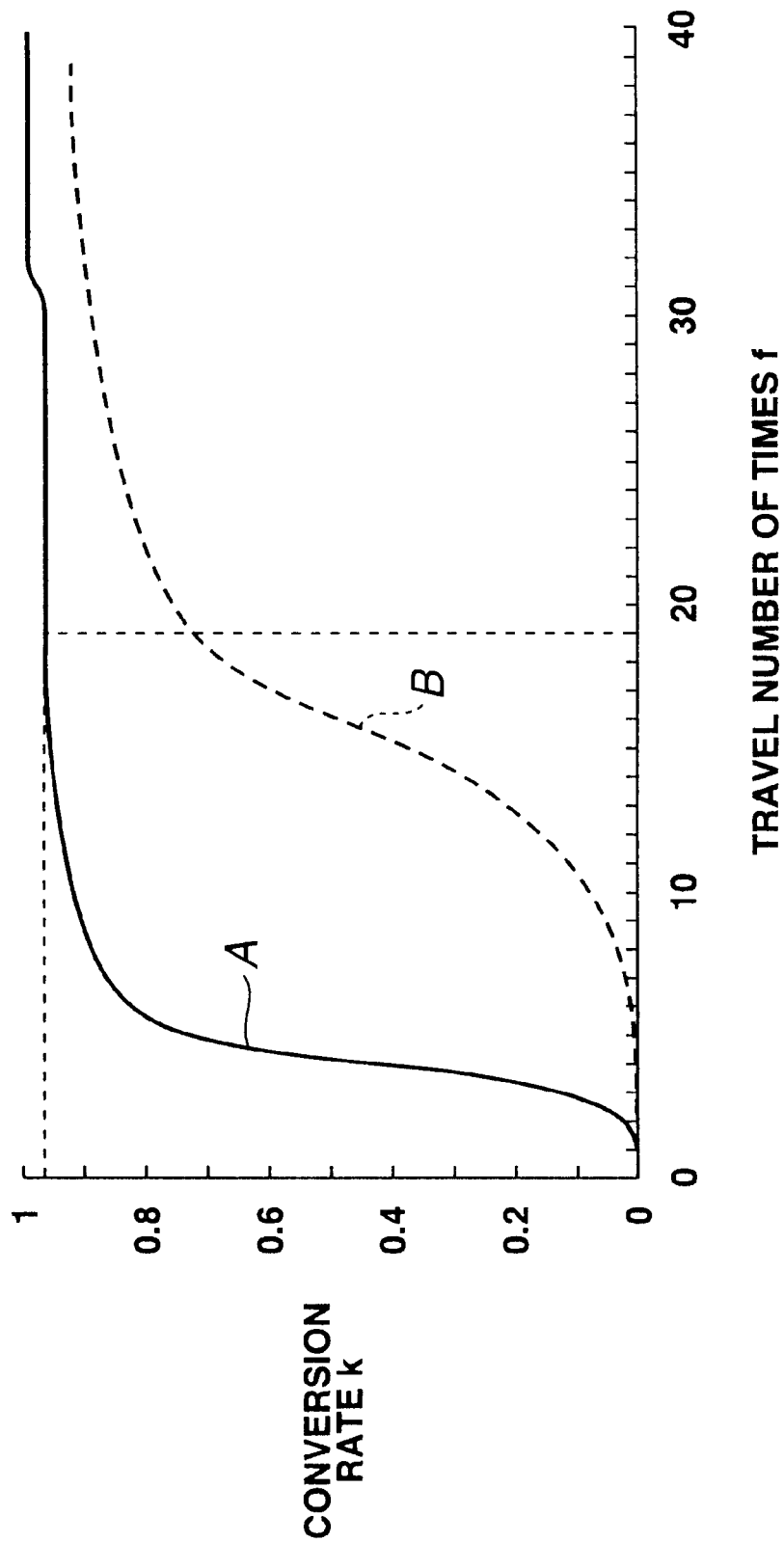
FIG. 5 is a characteristic graph representing a relationship between travel(ed) number of times and a conversion rate (conversion coefficient) to introduce to a conversion table.
Figure 6:
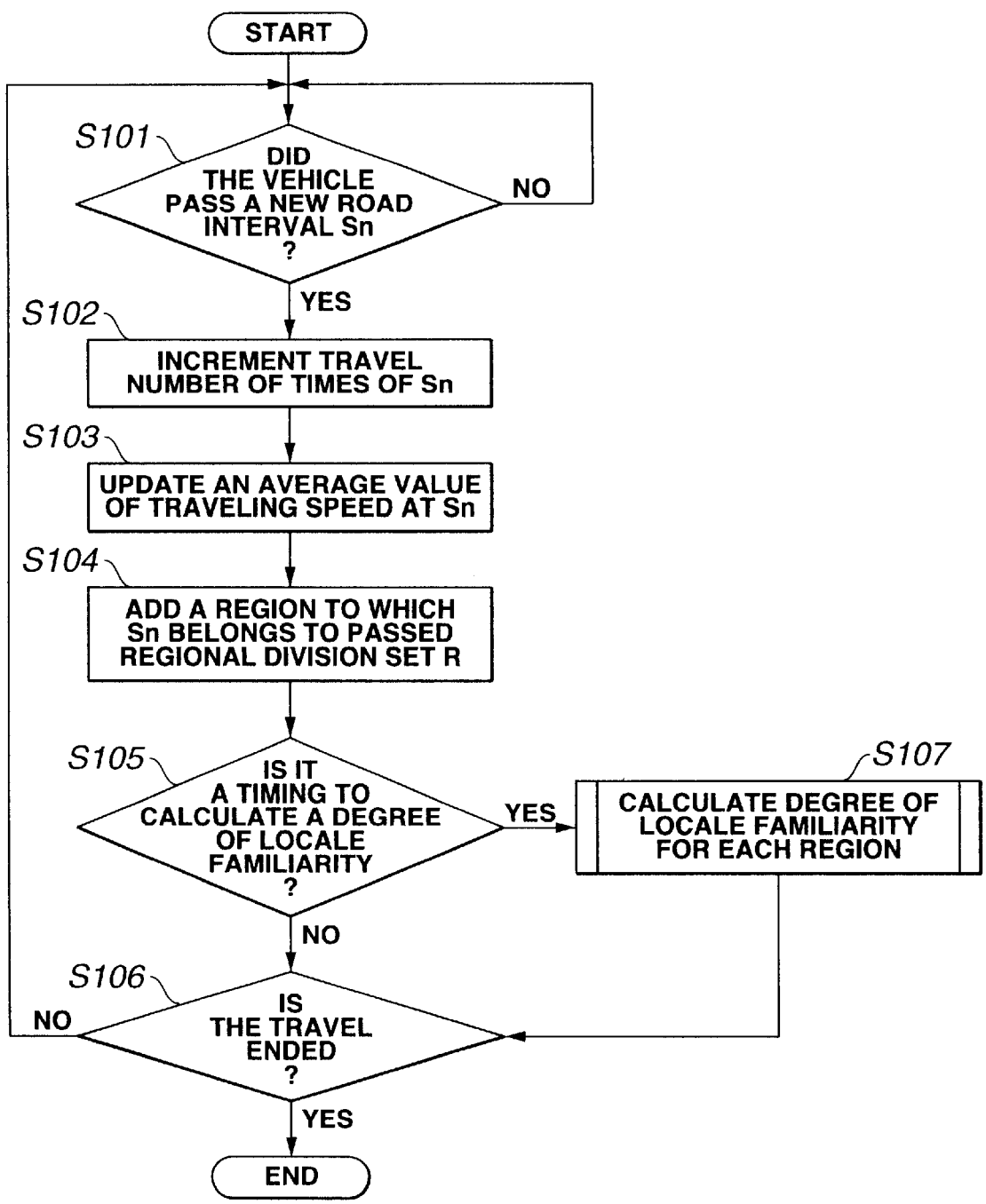
FIG. 6 is an operational flowchart for explaining an operation of the navigation system in the first embodiment shown in FIG. 1.
Figure 7:
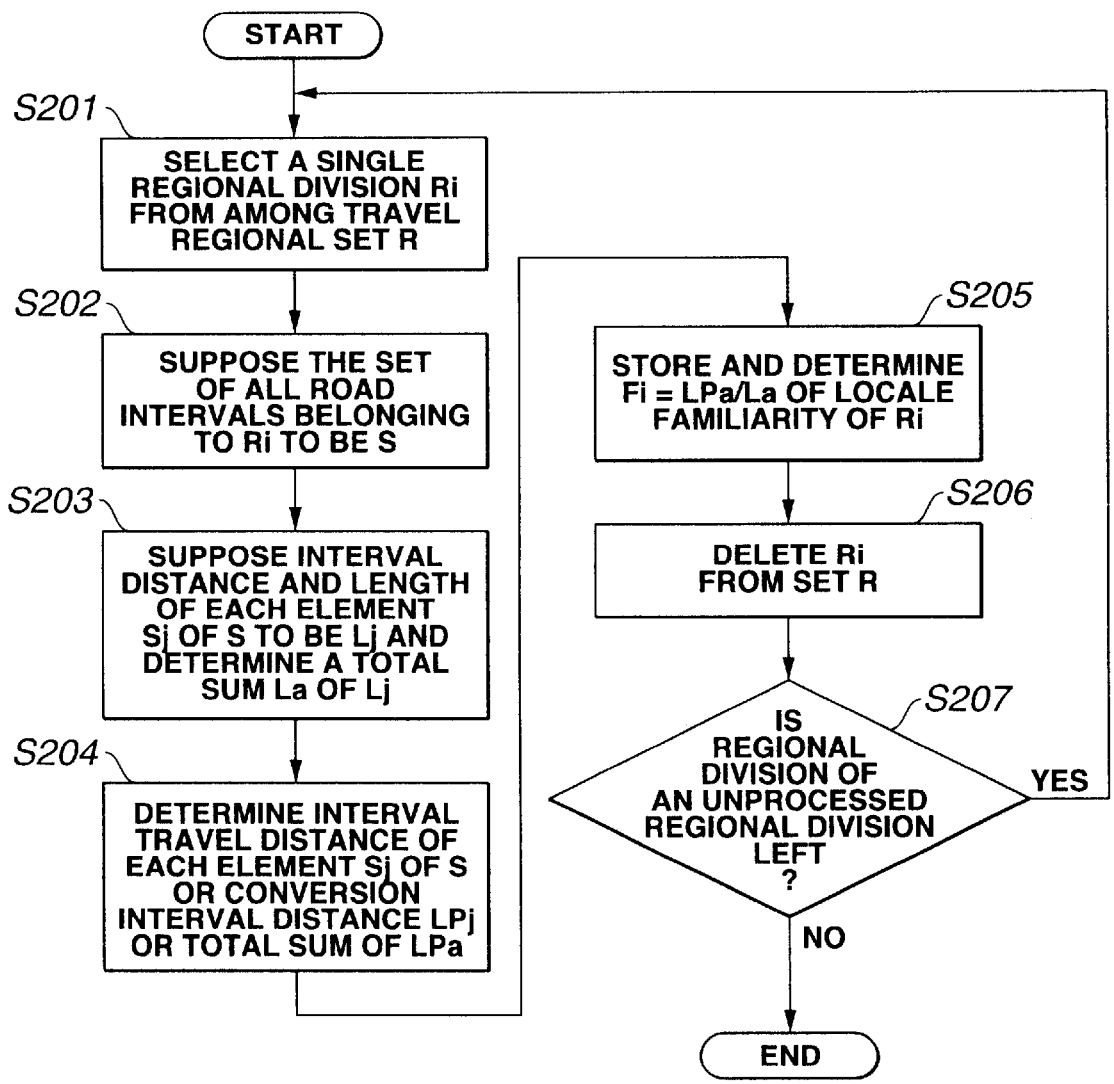
FIG. 7 is an operational flowchart for explaining a detailed routine of a step S107 shown in FIG. 6.
Figure 8:
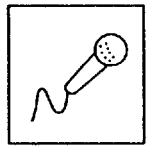
FIG. 8 is an example of an input interface of the navigation system in the first embodiment shown in FIG. 1.
Figure 9:
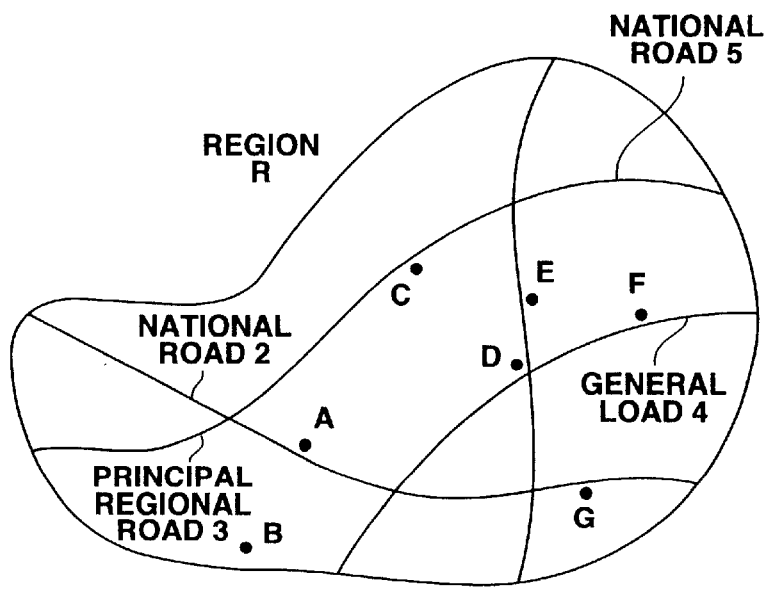
FIG. 9 is an explanatory view representing an example of a search for a destination in accordance with a user's degree of knowledge of a region (degree of locale familiarity with the region).

FIG. 1 shows a block diagram of a navigation system in a first preferred embodiment according to the present invention. FIG. 2A shows an explanatory view for explaining an example of a road map information and FIG. 2B shows an explanatory view for explaining an example of a road map information. FIG. 3 is an explanatory view for explaining a common interval group on the road map information. FIG. 4 is a table representing travel history and road map information mutually stored to be made correspondent with each other. FIG. 5 is a graph representing a relationship between a traveled number of times to derive a conversion table and a conversion rate k. FIG. 6 is a first operational flowchart for explaining an operation of the navigation system in the first embodiment. FIG. 7 is a second operational flowchart for explaining the operation of the navigation system in the first embodiment shown in FIG. 1. FIG. 8 is a table representing an example of an input interface. FIG. 9 is a table representing an example of a search in accordance with the degree of familiarity on a particular region. The structure of the navigation system in the first embodiment will be described below.

Navigation system 100 (usually installed in a vehicular compartment) includes, as shown in FIG. 1, an inputting section 1 to accept various kinds of information; an arithmetic processing section 2 (hereinafter, also called calculating section) that calculates a degree of (locale) familiarity with a particular region (local region) for each user (or a user) utilizing an automotive vehicle; a storing section 4 that stores various kinds of information including the road map information; an information retrieval section 3 (or called, information search section) that searches the road map information for an object of search such as a route of travel in accordance with the degree of familiarity on the region; and an output section 5 that produces the searched road map information to the user. Inputting section 1 includes a search condition inputting section 11 and a vehicular position detecting section 12. Search condition inputting section 11 accepts an information on a destination of a user to which the vehicle is desired to finally reach and an information on the search condition to retrieve the information to which the user seeks. An information inputting section which is generally used for such a navigation system as described above is applicable to search condition inputting section 11. A GUI (Graphical User Interface) system such that a cursor is used to select an item of menus displayed on an image screen may alternatively be applied to search condition inputting section 11. Or further alternatively, a voice inputting section constituted by a microphone input system and a speech recognition engine may be adopted to search condition inputting section 11. Or further alternatively, a touch panel system may be applied thereto. In addition, vehicular position detecting section 12 measures a present position of the vehicle by means of a GPS (Global Positioning System) sensor or a gyro sensor on a real time basis and outputs a result of the measurement in a form of, for example, longitude and latitude of an absolute present position.

A position of the vehicle inputted on the real time basis from vehicular position detecting section 12 is converted into a travel history in a form of the travel history for each predetermined road segment (or road interval) using a technique generally known, for example, a map matching technique and the travel history is stored into an update enabled recording medium such as a nonvolatile memory installed in inputting section 1 and/or storing section 4.

Various kinds of information such as the travel history thus retrieved are stored into storing section 4. Storing section 4 includes: a road map information storing section 41 storing the road map information thereinto; a travel history storing section 42 storing the road map information; and a conversion table storing section 43 storing conversion tables to perform a conversion on a travel distance in accordance with the travel history.

Storing sections described above store more specific information. In details, road map information storing section 41 stores a road map information 411, a road information 412, a road interval information 413, a region information 414, a common interval group information 415, a search condition list 416, and a familiarity degree information 417. Travel history storing section 42 stores a travel locus of vehicle information 421(the vehicle is, so-called, a host vehicle in which the navigation system according to the present invention is mounted), a traveled number of times information 422, a traveling speed information 423, the traveled road kind information 424, and vehicle stopped number of times information 425. Conversion table storing section 43 stores a travel number of times conversion table 431, an average velocity conversion table 432, a kind of road conversion table 433, and a stopped number of times conversion table 434.

Each information described above will be described below. That is to say, road map information 411 is an information related to a location or facility represented on the road map and the road map information used in an ordinarily available car navigation system. Road map information 411, in this embodiment, is made correspondent with travel history 421 and the retrieved travel history 421 can be displayed on road map information 411. In addition, road map information 411 may be stored as a hierarchy-dependent road map information having a hierarchy for each degree of detail on a scale of reduction or object matter display.

This road map information 411 includes a road information 412 and road information 412 includes the information on the kind of road and a road distance. Road information 412, in the first embodiment, is stored as a road interval (segment) information 413. That is to say, the road is divided into road segments (road intervals), each road segment having a predetermined distance from an end thereof to the other end thereof, and is made correspondent with a road interval set as a unit of information administration on the road distance as a road interval information 413. Road interval information 413 stored in the way as described above is shown in FIG. 2A. A road interval (a road segment) is denoted by each of S1, S2, S3, - - - , S15, S16, and S17 shown in FIG. 2A. It is noted that road interval information 413 includes the information on a start point position of each road interval and an end point position thereof, a length of the corresponding road interval, a region (a division of an administrative region) to which the road interval belongs, and the information according to the kind of road constituted by the road interval.

When a set of each road interval is carried out to form the road, the information related to a predetermined region including a plurality of roads is stored as region information 414. The set region may, for example, as shown in FIG. 2A, be divided into two regions by a boundary A shown in FIG. 2A, one of the two regions being C-Ward (CKu in Japanese), D-Town (D-Cho in Japanese) and the other region being C-Ward, E-Town in accordance with an information. In addition, a plurality of regions may be set including a region B by dividing a road map plane with a lattice form mesh, as shown in FIG. 2B. The region, as described above, can arbitrarily be set from standpoints of a calculation of the degree of locale familiarity, a display to the user, and a user's convenience. Each region thus set provides a unit of administrating road map information 411. A regional information corresponding to each region has the information related to a range of the set region, the roads or road intervals included in the region, and a whole length of the roads or road intervals included in the region. The calculation of the travel distance or degree of locale familiarity is carried out on the basis of the road intervals and the road interval corresponding region prescribed as described above.

In addition, in common interval group information 415 included in road map information, the common interval group is a group of any of the road intervals included in the travel history and the road map information which have common characteristic of, for example, common position, common direction, common distance, and other common characteristics and which are mutually associated with each other as the common interval group. Specifically, as shown in a grid (lattice) of a checkerboard formed road of FIG. 3, the common interval group is a group of a plurality of road intervals, the road intervals having a common characteristic in terms of at least one of the position, the direction, and the distance with one another, and is the group on the common characteristic such that the vehicle can be said to have run on any other road interval than one of the road intervals on which the vehicle has actually run from a standpoint of the degree of locale familiarity with this region and with the common position, the common direction, and the common distance in mind. That is to say, it can be considered that, even if the vehicle passes any of the road intervals positioned at the same row or same column of this region, a degree of contribution on the degree of familiarity to the region is the same. From the standpoint of the contribution on the degree of familiarity, the roads described above constitute common interval group information 415. The information on each road interval constituting such a common interval group as described above provides the common interval group information 415. Specifically, as appreciated from FIG. 3, SV1, SV11, SV12, and SV13 constitute the same common interval group. Road interval SV1 is a representative road interval and road intervals SH1, SH21, and SH31 constitute the same common interval group. Road interval SH1 is a representative road interval and road intervals SH1, SH21, and SH31 constitute the same common interval group. Road interval SH1 is the representative road interval. The other road intervals constitute respective common interval groups, SH2, SH3, SV2, and SV3 being respective representative road intervals.

Each road interval belonging to the common interval group set in the way described above is divided into a representative road interval belonging to the common interval group and other general road intervals which are replaceable with the representative road interval in the same common internal group. Each general road interval is made correspondent with a single representative road interval. Then, if the vehicle runs on any one or more of the general road intervals, navigation system 100 in the first embodiment determines that the vehicle has run on the representative road interval which is made correspondent with one of the general road intervals described above and calculates the representative road interval on the basis of the information on the corresponding representative road interval. The calculation on the information of the representative road interval will be described later in more details when an operation of the first embodiment of navigation system 100 according to the present invention is described.

Next, the information on the travel history will be described below. Travel history storing section 42 stores travel(ed) number of times information 422, traveling speed information 423, kind of road information 424, and a vehicular stopped number of times information 425. These pieces of information are stored for each user using the vehicle and are referred to when the degree of (locale) familiarity of the user with the region is calculated. This travel history 421 is a display representation of the instantaneous vehicular position outputted by vehicular position detecting section 11 on the road map information through such a technique such as a map matching.

In this embodiment, it is preferable for the travel history 421 to be managed (or administrated) for each road interval constituting the road. With this travel history 421 as a basis, what number of times the vehicle has run through each road interval of the set road is stored as a travel(ed) number of times information 422. Then, an average value of the traveling speeds on the corresponding road interval when the vehicle has run on the corresponding one of the road intervals is stored as a traveling speed information 423, the information on the kind of road, i.e., one of the road intervals on which the vehicle has run is an express highway (freeway), a national road, and a street is stored as road kind information 424, and the information such that the user has experienced a stop of the vehicle on each road interval or such that what number of times the user has stopped the vehicle on each road interval is stored as a stopped number of times information 425. It is noted that these pieces of information are stored to make correspondent with the respective road intervals.

As described above, road interval information 413 includes a length of the corresponding road interval, a class of the corresponding road, and administrative regional division to which the road interval belongs. These pieces of information are a static information as the administrative unit. A dynamic information such as the travel(ed) number of times information 422 and traveling speed information 423 may be stored into road interval information 413. FIG. 4 exemplifies such store form as described above.

Specifically, the travel(ed) number of times, the traveling speed, a length of each road interval (a distance of each road interval), road class, To-Do-Fu-and Prefectures, City (Shi in Japanese) and District (Gun in Japanese), Ward (Ku in Japanese) Town and Village, and Town Village Section are stored for each road interval from a first road interval S1 to a last road interval S17. In addition, an area code specifying a particular region to which the road intervals belong may be added to road interval information 413.

As described above, the structure of storing section 4 is not limited to the above-described structure. Travel history storing section 42, road map information storing section 41, and conversion table storing section 43 may be constituted by an integrated storing medium. Alternatively, these storing sections 41, 42, and 43 may be integrated with arithmetic processing section 2 and information search section 3 which are constituted by a computer having a CPU (Central Processing Unit) and an internal memory (ROM (Read Only Memory) and RAM (Random Access Memory) and their processes may be stored and executed by the computer in a form of program.

Each information on the travel history stored as described above is a factor contributing on the degree of familiarity with the region and a reference to the travel history permits more realistic and accurate calculation of the degree of locale familiarity with the region. In general, it is prospected that as the number of times the user' vehicle has traveled through the region, the degree of familiarity of the user with the region is more remarkably improved. In addition, it is prospected that the degree of familiarity of the user with the region becomes increased as the traveling speed becomes slower, rather than a high speed run through the region. In addition, it is prospected that a degree of an improvement in the degree of locale familiarity with respect to a travel experience is made different between one of the kind of roads such as a national road whose route is easy to understand and another kind of roads such as a street road in an urban area whose route is not easy to understand. Furthermore, it is prospected that, in a case where the user has an experience that the user has stopped the vehicle on the road interval, the degree of locale familiarity (with the region) in the road interval is improved more remarkably than the case in which the vehicle has not stopped on any of the road intervals in the corresponding region.

In the first embodiment, every factor that contributes on the degree of regional familiarity is analyzed and an accurate degree of familiarity with the region is calculated by referring to an analyzed result. These pieces of information can be used as the information such that the travel experience is present or not (viz., the travel number of times is once or zero). Or, these pieces of information can be used as the information indicating the degree of, for example, to what degree the traveling experience is present (the number of times the traveling using the vehicle is carried out).

What is prescribed from the standpoint of the latter information is each table stored in conversion table storing section 43

These conversion tables will be described below. Each conversion table is a table which makes a correspondent relationship with a conversion coefficient (rate) according to a specific content and a specific degree of the travel history. The conversion coefficient is a factor multiplied when a travel distance (interval travel distance) for each road interval is calculated. A relationship between the conversion coefficient (or conversion rate) and locale familiarity will be described below. It is noted that the degree of locale familiarity or the degree of familiarity with the region) can be defined as a rate of the distance by which the vehicle has actually traveled to a whole length of a road which is a total sum of the distances of the road intervals included in the same region. Specifically, the distance by which the vehicle has traveled for the road interval included in a predetermined region is accumulated and the travel distance accumulated for this region is divided by the whole length of the road which is a total sum of the distances of the road intervals included in the same region. This ratio (a quotient of this division) provides the degree of locale familiarity.

As described above, the regional travel distance is a value directly used when the degree of the user's familiarity with the region representing the degree of regional familiarity is finally calculated. When discussing the regional travel distance from this standpoint, it is appreciated that, if the region travel(ed) distance is a value varied in accordance with the improvement in the degree of regional familiarity and a more accurate degree of regional familiarity can be calculated.

For example, it cannot be said that a determination that the user is familiar with a certain region from such a fact that the user's vehicle has merely once traveled through any one or more of the road intervals within the certain region does not always reflect on the user's degree of familiarity with the certain region with a high accuracy. Perhaps, it may be considered that the user's recognition on a surrounding area of the same road interval cannot become so high due to only once or twice travels on the same road interval and, as the traveled number of times are increased, a gradual recognition on the surrounding environment is resulted. On the other hand, after the travel(ed) number of times are increased to same degree, it is considered that an improvement in the degree of regional familiarity becomes dull even if the vehicle runs on the road interval.

As described above, a correlation between a learning trial number of times and a memory firm (or print) rate such that how many times the learning to a certain object are carried out by a human being can experimentally be obtained as, for example, shown by a relationship of a curve A in FIG. 5. This correlation can be replaced with a relationship between the number of times the vehicle has passed through the road interval and the degree of locale familiarity to the region to which the road interval belongs. Specifically, suppose that the degree of familiarity to the road interval distance is proportional to a distance of passage. A coefficient in a case where the user is completely familiar with the region is set to "1" and the coefficient in a case where the user does not have any knowledge of the region is set to "0". This coefficient is multiplied with a road interval distance. Thus, from the standpoint of the contribution on the degree of locale familiarity, so-called, the knowledge of the region, a "converted interval travel distance" which is converted in such a way that part of the actual travel distance is deemed to have passed is derived. A multiplier to convert this interval travel distance into conversion interval travel distance is called conversion coefficient denoted by k. This conversion coefficient (rate) k may be a function. In this embodiment, curve A shown in FIG. 5 is expressed in a function form of k(f) of the traveled number of times on any one of the road intervals f to conversion coefficient k. Suppose that an interval road distance of road interval Sj is Lj, the traveled number of times is fj, conversion interval travel(ed) distance determined according to fj is LPj. LPj= k(fj)×Lj. If this converted interval travel(ed) distance is accumulated for each region, a converted region travel(ed) distance can be derived. In this way, the region travel(ed) distance is an accumulation of the interval travel distance which is a travel distance for each of the road segments (or road intervals). If such a correlation as described above can be reflected on the interval travel distance, the region travel distance, and, so-called, an actual travel history can sufficiently be reflected on the region travel distance, in its turn, the degree of regional (locale) familiarity (with the region). The correlation between the travel(ed) number of times and degree of familiarity with the region has been described. The inventors have further discussed the travel history in order to make the degree of (locale) familiarity calculated in this embodiment approach further to the actual degree of locale familiarity (acquaintance with the place) and have extracted another factor than the travel (ed) number of times to contribute on the degree of locale familiarity. For example, if the travel(ed) number of times are less and the region travel(ed) distance is short, the user's degree of familiarity with the corresponding region is lowered. On the other hand, if the travel(ed) number of times are many and the region travel(ed) distance is long, the user's degree of familiarity with the corresponding region becomes high. However, it cannot be said that these have simple proportional relationships. For example, in a case where the vehicle merely passes a road which has fences between both sides to separate the road proper from a surrounding environment such as an express highway fence, it can be prospected that the degree of locale familiarity is not so remarkably improved. In this embodiment, in order to reflect the travel history more actually on the degree of familiarity, so factors which contribute on the degree of familiarity therewith is selected from factors included in the travel history. Then, the selected factors are analyzed in terms of how each of the factors contributes on the degree of familiarity. The analytical result is expressed as the conversion coefficient. The degree of the travel history and conversion coefficient are stored in storing section 4 in a form of conversion table. In this embodiment, in order to enable a utilization of each factor included in the travel history, for example, in order to enable factors of both of the travel(ed) number of times and road kinds to be reflected on the degree of familiarity, the conversion coefficient is prescribed as a coefficient to be multiplied with the travel(ed) distance for each road interval. However, it is possible to constitute the conversion table as a coefficient to be multiplied with the region travel(ed) distance which is the result of accumulation of the interval travel distance.

In this embodiment, in addition to the travel(ed) number of times, an average velocity, the kind of road, and the stopped number of times are selected as respective factors of the travel history which contributes on the degree of locale familiarity. Correspondingly, a travel(ed) number of times conversion table 431, an average velocity conversion table 432, a road kind conversion table 433, and stopped number of times conversion table 434 are provided. These tables will specifically be explained below.

As described before, in a case, for example, where the vehicle merely passes a road whose sides are enclosed from the surrounding environment such as the express highway (freeway), it is prospected that the degree of familiarity with the region is not remarkably improved even if the number of times the vehicle has passed the above-described road are increased. In such a case as described above, it is preferable to use such a function that conversion rate (conversion coefficient) is not easily increased even if the traveled number of times are increased, as shown by a curve B in FIG. 5. At this time, if the kind of road such as the road class for each road interval is stored, which function of curve A or B should be used can be determined according to the kind of road. In addition, if, for example, the vehicle runs on the same national road, it can be thought that a difference in the degree of locale familiarity occurs when the vehicle runs on a city street at a low speed and when the vehicle passes an interurban at a high speed. Hence, as shown in FIG. 4, the average value of the traveling speeds for each road interval is stored. A general determination from the traveling speed and kind of road can properly and separately use the conversion rate (conversion coefficient or conversion function). On the other hand, in a case where the vehicle is stopped on a certain road interval and a vehicular occupant gets off the vehicle, it is considered that the degree of familiarity with the surrounding environment to the vehicle may be improved. Hence, this factor may be stored, particularly, as the stopped number of times information for each of the corresponding road intervals. Or alternatively, this case may be reflected on traveling speed information 423 so that a special value is written into the traveling speed information 423 and a higher increase rate of conversion rate (function) may be used for the road intervals at which the vehicle has experienced its stops.

In the way described above, the travel(ed) number of times, the traveling speed, the kind of road, and the stopped number of times are factors which contribute on the degree of familiarity with the corresponding region. Hence, it is preferable to modify the conversion rate (conversion function) more finely in accordance with various combinations.

Next, function and operation of arithmetic processing section 2 will be described below. Arithmetic processing section 2 includes: a distance calculating section 21 that calculates the interval travel distance by which the vehicle has traveled for each road interval; a distance accumulating section 22 that accumulates the interval travel(ed) distance for each predetermined region to calculate the region travel (ed) distance for each predetermined region to calculate the region travel(ed) distance; and a degree of locale familiarity calculating section 23 that calculates the degree of locale familiarity from a whole length of the road which is a total sum of the distance of the road included in the corresponding region and the region travel(ed) distance. Specifically, distance calculating section 21 refers to a distance for each road interval stored previously in road interval information 413 to calculate the travel(ed) distance at the corresponding road interval in accordance with the travel history of the vehicle.

A travel distance calculation function in an ordinarily available car navigation system performing the map matching while calculating the travel distance can be used. A plurality of road intervals are included in the predetermined region. Distance accumulating section 22 accumulates the interval travel distance for each road interval through which the vehicle has traveled for each region in which the corresponding road interval is included. In addition, degree of locale familiarity calculating section 23 retrieves the information of the whole length which is a total sum of the distances of the road segments included in the predetermined region. This information may previously be calculated or arithmetic processing section 2 may calculate the whole length described above whenever the degree of familiarity described above is calculated.

In this embodiment, from a standpoint of a processing time, the whole length of the road for each predetermined region is stored. The road which is an object of the data on the whole length of the road serves as an object of the calculation of the degree of locale familiarity.

That is to say, if the object of the road whose distance is accumulated is only a trunk road such as national road, objects of the calculated region travel distance and the calculated degree of familiarity are the same trunk road. If the distance of the road including streets in an urban city is accumulated to provide the data of the whole length of the road, the object of the calculated degree of locale familiarity is also such streets as described above. In this way, it is possible to calculate the degree of locale familiarity suitable for this region by changing the object of the degree of locale familiarity. As described above, the data on the road whole length retrieved by the degree of familiarity calculating section 23 is not only limited to one kind but may be the road whole length including the road whole length limited only to the trunk road or the street in the case of the urban city.

In this way, degree of locale familiarity calculating section 23 calculates the degree of familiarity using the data on the retrieved road whole length. Specifically, the region travel distance calculated by distance accumulating section 22 is divided by the whole road length to derive a ratio of the region travel(ed) distance to the whole length of the road. This ratio represents the degree of locale familiarity. Thus, the calculated degree of locale familiarity is stored into each region within road map information 411 of storing section 4.

The calculated degree of locale familiarity is reflected on the road map information provided in a result of search. The roadmap information defined herein includes positions of store and other facilities in addition to the road map proper. Information search section 3 accepts the degree of locale familiarity calculated by arithmetic processing section 2 and searches the road map information on the basis of the calculated degree of locale familiarity. This information search section 3 includes a search section 31 and search condition updating section 32. Search section 31 searches the road map information on the basis of the search condition inputted by the user through search condition inputting section 11. In this embodiment, the degree of locale familiarity is reflected on this search. Specifically, in a case where a search result information corresponding to the search condition that the user establishes is the information related to a high degree of locale familiarity region, search section 31 can provide a high degree of the detailed road map information. On the contrary, in a case where the search result information corresponding to the user's search condition is the information related to a low degree of locale familiarity, search section 31 can provide a low degree of the detailed road map information (wide-area road map information). Correspondingly, road map information 411 may be edited according to a hierarchy for each degree of the details.

In addition, search condition updating section 32 utilizes the degree of locale familiarity in the process of search. The search condition inputted by the user is a data base related to the search object, in this embodiment, is stored into a search condition list 416 of road map information storing section 41. A search process is executed in response to the input of the search condition in accordance with the search condition list. For example, suppose that the search condition aligned in an order of To-Do-Fu and Prefectures, City-Ward-District, and Ku-Cho-Son (Ward-Town-Village) is set on the road map information. In this case, it is necessary to input the search condition in spite of a high or low degree of the user's familiarity. However, it is troublesome to input all of this search condition every time the user goes to a well recognized region, viz., the user goes to the region that the user frequently goes. To avoid this troublesome operation, search condition updating section 32 automatically adds a name of place of a lowest hierarchy representing a certain region (a specific name that the user is accustomed to call) if the degree of familiarity with a certain region is in excess of a predetermined value (for example, 70%) to search condition list 416. As described above, a name of place with which the user is familiar is registered as the search condition. The user directly input this name of place as the search condition so that a target (desired) road map information can be obtained. It is, therefore, not necessary to input the search condition aligned in the order of To-Do-Fu- and Prefectures, City-Ward-District, and Ward-Town-Village to be inputted, in principle.

The searched road map information as described above is transmitted to an output section 5. Output section 5 produces the road map information to the user. Output section 5 provides the information for the user by producing the road map information through a display and producing the information through a voice guidance.

Next, a basic operation on above-described navigation system 100 in the first embodiment will be described with reference to FIGS. 6 and 7.

FIG. 6 shows a flowchart representing a general concept of a calculating operation of the degree of locale familiarity along with a travel of the vehicle. It is noted that the calculating operation described with reference to FIGS. 6 and 7 is activated for each vehicle in a case where the user of the vehicle can be identified but, in a case where the vehicle is utilized by a plurality of users, the calculating operation is, preferably, carried out for each of the users. In this embodiment, with the user identified, a series of calculating operations shown in FIGS. 6 and 7 is carried out. Well known user identification means may be used such as a retrieval of a user ID (Identification) information. The travel history and the calculated degree of (locale) familiarity are administrated for each of the users.

Referring to FIG. 6, at an activation step S101, the vehicle moves and waits for the vehicle to pass through a new another road interval (or segment). If the microcomputer, i.e., calculating section (arithmetic processing) 2 determines that vehicle passes the new road segment Sn(Yes) at step S101, the routine shown in FIG. 6 goes to a step S102. At step S102, arithmetic processing section 2 increments the travel(ed) number of times of the corresponding one of the road intervals Sn. At a step S103, arithmetic processing section 2 updates an average value of the travel(ed) passage velocity of Sn. That is to say, if the traveled number of times incremented are denoted by f, an average value of the traveled speed before the update is by $v_0$, the traveling speed when the vehicle has passed this time through Sn is denoted by v1, an average value vn of the traveling speed to be derived may be expressed as vn=((f−1)×$v_0$+v1)/f - - - (1). At this time, such an information as the road kind information of Sn, and the stopped number of times information, viz., whether the user has stopped the vehicle at the road interval of Sn or how many times the vehicle has stopped may be stored together in storing section 4. These pieces of information a restored in the same manner as the travel history and road map information shown in FIG. 4.

At a step S104, arithmetic processing section 2 checks to set if Sn belongs to the region, namely, which of the regions the vehicle has stopped through. In this case, suppose that a set of divided predetermined local regions through which the vehicle has passed is denoted by R and sets of sums between the divided region to which Sn belongs whenever the vehicle passes through region Sn and R are taken.

For example, if the vehicle has passed road segment (road interval) S1 shown in FIG. 4, R={A-prefecture, B-City, C-Ward, and D-Town}. Furthermore, suppose that the vehicle has advanced from S2 to S3, Ward-Town-Village hierarchy or higher from among the divided region to which S3 belongs is already included in R. Hence, in this case, R={A-prefecture, B-city, D-town, and E-town}. In the way described above, the region of Sn through which the vehicle has run is stored as the travel history. At this time, set of this region R is indicated by area code. It is, of course, possible to encode set R of the divided region.

Ordinarily, the above-described processing is repeated during the run of the vehicle. However, at a time point at which the travel history is updated to some degree, such a calculation process as a road passage rate for each passage, divided region included in R, viz., the degree of locale familiarity is entered.

For example, a constant period of time has passed from a time point at which a previous calculation process of the degree of locale familiarity or a constant distance at which the vehicle has traveled, a determination is made that it is a timing at which the degree of locale familiarity should be calculated and the routine goes to a step S107. In addition, the calculation of the degree of locale familiarity may be executed whenever the vehicular travel has once been ended. In this case, the determinations at steps S105 and S106 are the same.

FIG. 7 shows an operational flowchart representing a detail of an operation of step S107 shown in FIG. 6. That is to say, at step S201, arithmetic processing section 2 selects a single divided region Ri (for example, D-town) from among set R of the divided regions. It is of course that a method of the selection may be arbitrary. At the next step S202, arithmetic processing section 2 collects all road intervals belonging to region Ri, the collected set is called S. If D-town of FIG. 3 is selected as region Ri, referring to FIG. 4 gives S (D-town)={S1, S2, S6, S7, S11, S12, S13}. Furthermore, at a step S203, arithmetic processing section 2 derives a total sum La of the interval road distance for each road interval grouped as S(D-Town). If one of the road intervals collected in S (D-town) is Sj and its corresponding interval road distance is Lj; La=$\Sigma_j$ Lj - - - (2). In the above-described example, La=L1+L2+L6+L7*L11+L12+L13=L312+218+172+66+548+225=1863. It is noted that La is not dependent on the travel history but an invariable static information unless a shape of any road is not changed. Hence, if a whole length of the road is the total sum of the road intervals of the road included in the above-described divided region is stored for all divided regions, it is not necessary to calculate equation (2) at each time. Hence, a high speed processing of the calculation of the degree of locale familiarity can be achieved.

At a step S204, arithmetic processing section 2 derives travel(ed) distance of the vehicle for each road interval Sj of S (D-town) or the travel(ed) distance LPj converted according to the travel history. The distance value is accumulated to derive a total sum LPa. As a simplest method, the travel(ed) distance corresponds to a length Lj of the corresponding road interval if the vehicle has experienced traveling the road interval Sj and the travel(ed) distance indicates zero when the vehicle does not have the experience described above. That is to say, travel(ed) number of times is fj for Sj and, then, the following equation (3) is carried out. LPj=Lj (if fj=1) and LPj=0 (if fj=0) - - - (3).

In addition, in a case where the vehicle has traveled part of the road interval, a rate of the travel[ed] distance to the whole length of the road interval may be deemed to be the travel(ed) number of times and may be calculated as LPj=fj×Lj (if fi>0). For example, when the vehicle has traveled a half of the road interval, the traveled number of times is 0.5 so that the traveled number of times is 0.5. Thus, interval travel(ed) distance may be Lpj=0.5×Lj. For the twice or more of the plurality of travels, the above equation can be applied equally well to such travels as described above.

A total sum LPa of the distance of the road included in the divided region is LPa=$\Sigma_j$ Lpj - - - (4).

In the example of the travel history shown in FIG. 4, road interval S11 is only the road interval on which the vehicle does not experience of traveling from D-town. Hence, LPa=La−L11=1863−266=1597. Of course, S1 S2, - - -, may be accumulated. In this way, the region travel(ed) distance which is the sum of the travel(ed) distances for the respective road intervals included in the above-described region is calculated.

In this embodiment, the correlation between the learning trial number of times of the human being and memory firm rate thereof is replaceable with the correlation between the traveled number of times of the road interval and the degree of locale familiarity with the region to which the above-described road interval belongs, converted internal travel (ed) distance which is converted with a part of the actual travel(ed) distance through which the vehicle has passed is derived from the standpoint of the contribution onto the degree of locale familiarity, and a multiplier to convert the interval travel(ed) distance into the converted interval travel (ed) distance is called conversion coefficient k. From this viewpoint, the detailed explanation thereof has been described with reference to the conversion table in the storing section 4. In this case, specifically, the conversion efficient is used to derive the converted interval travel distance. In this embodiment, curve A shown in FIG. 5 is expressed in a form of a function k(f) which is a calculation of the traveled number of times f of the road intervals of conversion coefficient k. If the interval road distance of road interval Sj is Lj, the travel(ed) number of times is fj, and a converted interval road distance defined according to fj is denoted by LPj. LPj=k(fj)×Lj - - - (5).

Conversion coefficient k is derived on the basis of function A denoted in FIG. 5. In the example of the travel history of FIG. 4, for example, the converted interval travel(ed) distance of road interval S1 gives as LP1=k(19)×312=302 m since the travel(ed) number of times is 19 and the corresponding conversion coefficient is 0.968. In addition, for the whole D-town, each converted interval travel (ed) distance is calculated and the total sum of the converted region travel(ed) distance gives 1325 meters. 1325 meters is made smaller than the value derived from equation (3). It is noted that function k(f) of the conversion rate may preferably be modified according to a specific state. The conversion rate according to the degree of contribution of each factor affecting the degree of locale familiarity is defined. By applying this conversion rate, the degree of locale familiarity can be estimated with high accuracy.

In the way described above, converted region travel(ed) distance LPa which is the sum of the converted regional travel(ed) distance from equations (5) and (4) which derive converted interval travel(ed) distance. If a total sum LPa of region travel(ed) distance or converted region travel (ed) distance at divided region Ri is derived, the routine goes to a step S205 at which a region passage rate Fi of Ri is derived as follows: Fi=LPa/La - - - (6). With this region passage rate Fi as the degree of locale familiarity with divided region Ri, this value of Fi is stored into degree of familiarity information 417 of storing section 4. If this degree of locale familiarity is calculated in the example of the travel history of FIG. 4, the degree of locale familiarity with D-town in a case where the converted locale travel(ed) distance is derived in accordance with the travel(ed) number of times is 71.1% and that with E-town is 28.7%. In addition, if only D-town and E-town are present in C-ward, the degree of locale familiarity with whole C-ward is 50.4%. In this way, the region division which is an object of the degree of locale familiarity can arbitrarily be set as a small region or as a large region. Thereafter, value of Ri is erased from set R of the region division at step S206 through S207. If no unprocessed divided region is left, the calculation of the degree of locale familiarity is again repeated. The degree of locale familiarity is again calculated for each of all divided regions and the process is ended after it is stored. Then, the routine of FIG. 7 is ended. The basic operation (first embodiment) of navigation system 100 according to the present invention has been explained. Further preferable embodiments will be explained below.

<First Embodiment>

A function to be described in this embodiment is the function at road interval distance calculating section 21 in arithmetic processing section 2.

In this embodiment, arithmetic processing section 2 includes the degree of locale familiarity of the common interval group by referring to common interval group information 415 in storing section 4. This common interval group has been described in details in the common interval group information. In the road arranged like a checkerboard form, the road intervals having the common characteristics of the position, the direction, and the distance and the others to the respective road intervals and being mutually associated with each other are formed into the group of common interval groups. Specifically, the common interval group will be explained with reference to FIG. 3. As described before, this common interval group is divided into one representative road interval representing this common interval group and other general road intervals replaceable with this representative road interval, each general road interval being made correspondent with the single representative road interval. In the whole road shown in FIG. 3, a group of road intervals SV1, SV11, SV12, and SV13 constitute one common interval group having SV1 as the representative road interval and a group of road intervals SH1, SH21, and SH31 constitute another common interval group having SH as the representative road interval. There are other common interval groups with SH2, SH3, SV2, and SV3 as respective representative road intervals. An operation of this embodiment will be described with the common interval group information 415 edited as described above as an presumption. At a location where thin roads are crowded like a grid of checkerboard, it can be presumed that there is a situation that even if the traveled number of times is not increased for all of such narrow roads, the user has the good knowledge of that location. However, according to the method described hereinbefore, the degree of locale familiarity is calculated by deriving the ratio of the converted region travel distance to the whole length of the road included in the region. In such a road as described above (viz., the road segments are crowded together like the grid of the checkerboard), the calculated value of the degree of locale familiarity is not quickly be increased and an exfoliation of the calculated value thereof from an actual degree of locale familiarity of the user with the region (the user's actual plenty knowledge of the local region) occurs. Therefore, in such a region as described below, the degree of locale familiarity is considered with the single road interval within the common interval group as the representative. That is to say, as far as a total sum of the interval road distances is concerned, the total sum of the road intervals excluding the grouped road intervals which are not representative, namely, the general road intervals is calculated. In addition, as far as the travel history is concerned, even if the vehicle has passed any of the road intervals belonging to the same common interval group, navigation system 100 deems these general road intervals that the vehicle has passed through the representative road interval.

In the example of FIG. 3, the total sum of the road interval distances is supposed to be derived from fourteen segments of S1 through S8, SH1 through SH3, and SV1 through SV3. For the travel history, in a case where such a locus as shown by vehicular travel history in FIG. 21 is followed, on an assumption that the vehicle has passed through SV1 in place of actual pass through SV11, the vehicle has passed through SH12 in place of actual pass through SH2, the vehicle has passed through SV2 in place of SV22, the vehicle has passed through SH3 in place of SH23, the vehicle has passed through SV2 in place of actual pass through SV22, the vehicle has passed through SH3 in place of the actual pass through SH23, and the vehicle has passed through SV3 in place of the actual pass through SV33, the traveled number of times that the vehicle has passed through these representative road intervals are incremented. If the vehicle has passed through the representative road interval (SH1) itself or passed through any road intervals (S3 and S8) which are not grouped into the common interval group, the increment of the traveled number of times are increased and the process such that the degree of locale familiarity can accordingly be increased can be carried out. In a case where the degree of locale familiarity with a wide region such as To-Do-Fu-prefecture is calculated, it is not necessary to derive total sums of the interval travel distances and converted interval travel distances for all roads from the trunk roads up to the narrow roads (streets). For example, with only the national road to be the object of the calculation of the degree of locale familiarity and with any road intervals whose road classes are lower than the national roads grouped by any road intervals positioned in the vicinity of the above-described road intervals into the common interval group. With these road intervals represented by the road intervals belonging to the national roads, an inclusive degree of locale familiarity with each region may be calculated.

<Second Embodiment>

A second embodiment of navigation system 100 is concerned with a function on search condition updating section 32 of information search section 3. Search condition updating section 32, as described above, automatically adds the name of place having a lowest hierarchy representing the region, as far as the region is concerned, (a specific name with which the user is acquainted to call) into search condition list 416. FIG. 8 shows a display example of an address input image screen in a case where an address is inputted to search for a point of place. Particularly, in a case where the address is inputted in a vocal form, tremendous amounts of names of places need to directly be recognized and a large scale of recognition dictionary is needed. In this addition, it is very difficult to achieve a practical level of recognition rate. It is, therefore, a general practice that the user makes a speech of the names of places sequentially from To-Do-Fu-Prefecture to those in lower hierarchy and that a recognized object word is throttled. It is noted that English sentence of each bracket in FIG. 8 is a direct translation of each corresponding Japanese sentence.

In this embodiment, for the divided region in which, particularly, the degree of locale familiarity is high, for the divided region in which the degree of locale familiarity equal to or higher than 70% is derived, its name of place is added into search condition list 416 as the recognition object word. Thus, the higher order hierarchy is omitted but, according to its name of place, it is possible to be directly inputted. For the location at which the user often be visited, such a simple input as Hakone-cho can be used and the tiresome operation can be eliminated.

<Third Embodiment>

A third embodiment of navigation system 100 is concerned with a function related to search section 31 of information search section 3. Although navigation system 100 according to the present invention serves to provide the road map information in accordance with the degree of locale familiarity. In this embodiment, the object of the search is scale expanded or scale reduced in accordance with the degree of locale familiarity.

Specifically, the function of each search section 31 in the third embodiment will be described with reference to FIG. 9. In this embodiment, the road map information 41 of storing section 4 stores the information related to the classes of roads adjacent to respective objects (the objects are such as the destination at which the user of the vehicle finally desires to arrive, viz., a certain point of place or facility) such that the object is located along a certain national road or along a general road. In a case where the search condition to search a certain object is inputted, navigation system 100 controls the search of the route by an expansion of a range which is an object of the search or a reduction in scale thereof such that the search thereof should be carried out for only the object along a narrow and complicated road (street) whose road class is low and should be carried out for only the object along a wide road (national road or son on) whose road class is high depending upon whether the point of place which is the object of the search is placed in a region where the degree of locale familiarity is low or high. If the user carries out the search, for example, for a certain object, there is a possibility that the user knows that the object is located in the narrow street even if the user has a plenty knowledge of the region, viz., the degree of locale familiarity of the user with the region is high and the object of search placed on the street is produced to the user as a result of the search. Hence, according to an occasional situation, the user can determine himself whether the user starts for the object or not. On the other hand, if the object placed on the street is produced in a region with which a low degree of locale familiarity of the user and the user selects the object, the user is needed to start for the object placed in the narrow street in spite of the fact that the user has no knowledge of the region. In the third embodiment, in order to avoid such a situation as described above, if the degree of locale familiarity is low, navigation system 100 in the third embodiment does not produce the object located along such a narrow, crowded, street as described above as the result of search.

FIG. 9 shows an example of a distribution of convenience stores within a certain region R. In FIG. 9, reference numerals 2 and 5 indicate national roads, reference numeral 3 indicates a principal regional road, a reference numeral 4 indicates a general road having a lower class than a principal regional road. If R is the region having the high degree of locale familiarity of the user, for example, the region having 70% or more degree of locale familiarity, seven convenience stores of A, B, C, D, E, F, and G are produced to the user as the result of search of convenience store with region R. On the other hand, if the user's degree of locale familiarity with region R is not so high, any of seven convenience stores of A, B, C, D, E, F, and G which are not placed along the national roads or principal regional roads, e.g., convenience stores B and F are excluded and only five convenience stores A, C, D, and E are produced to the user as the result of the search. Consequently, navigation system 100 in the third embodiment can uselessly avoid the setting of the destination at which the vehicle is not easy to arrive at over a location of which the user has no plenty knowledge. Navigation system 100 having a high convenience can be achieved.

As described above, navigation system 100 in the third embodiment can obtain the degree of locale familiarity as the inclusive knowledge of the whole region that cannot be obtained from the degree of locale familiarity with a point as a basis based on the point of place with which the user is familiar with or with a line as the basis based on the user's travel history. The degree of locale familiarity of the user with the region to be searched can accurately be acknowledged and the road map information on which the user's plenty knowledge of the region is reflected can be provided.

In addition, the factors which contribute on the user's knowledge of the region such as the travel(ed) number of times, the average traveling speed, the kind of road, and stopped number of times are acknowledged and these factors can be reflected on the degree of locale familiarity.

The degree of locale familiarity with the region which is nearer to the actual knowledge of the locale obtained by the user according to his experience and the road map information in accordance with the user's knowledge of the locale can be provided.

While the preferred embodiments of the present invention have been described using specific terms, such description is for illustrative purpose only, and it is to be understood that changes and variations may be made without departing from the spirit or scope of the following claims.

The entire contents of a Japanese Patent Application No. 2001-281048 (filed in Japan on Sep. 17, 2001) are herein incorporated by reference. The scope of the invention is defined with reference to the following claims.

What is claimed is:

1. A navigation system for an automotive vehicle, comprising:

a storing section that stores therein a travel history of the vehicle which is made correspondent with a road map information;

a calculating section that calculates a degree of familiarity with one of predetermined regions for each of the predetermined regions in the road map information on the basis of the travel history of the vehicle and its corresponding road map information; and an information producing section that produces the road map information in accordance with the degree of familiarity with the one of the predetermined regions calculated by the calculating section.

2. A navigation system for an automotive vehicle as claimed in claim 1, wherein the storing section stores the travel history for each of a plurality of road intervals into which a road included in the one of the predetermined regions of the road map information is partitioned by a predetermined interval and wherein the calculating section comprises: a distance calculating section that calculates an interval travel distance by which the vehicle has traveled for each of the road intervals on the basis of the travel history and the road map information; a distance accumulating section that accumulates the calculated interval travel distance for each of the predetermined regions in which the corresponding road interval is included to calculate a regional travel distance for each of the predetermined regions; and a degree of familiarity calculating section that retrieves a whole road length of a total sum of distances of the road included in the one of the predetermined regions determined on the basis of the road map information to calculate a ratio of the regional travel distance to the whole road length to calculate a degree of familiarity with the one of the predetermined regions for each of the predetermined regions.

3. A navigation system for an automotive vehicle as claimed in claim 2, wherein the travel history includes an information related to a number of times the vehicle has traveled through the one of the road intervals and wherein the distance calculating section calculates the interval travel distance in accordance with the number of times by which the vehicle has traveled through the one of the road intervals.

4. A navigation system for an automotive vehicle as claimed in claim 3, wherein the storing section stores a traveled number of times conversion table prescribing calculation equations to be applied to a calculation of the interval travel distance by the distance calculating section in accordance with the travel number of times the vehicle has traveled through the one of the road intervals and the distance calculating section refers to the travel number of times conversion table to apply one of the calculation equations in accordance with the number of times the vehicle has traveled through the one of the road intervals.

5. A navigation system for an automotive vehicle as claimed in claim 2, wherein the travel history includes an information related to an average vehicular velocity for each of the road intervals through which the vehicle has traveled and wherein the distance calculating section calculates the interval travel distance in accordance with the average vehicular velocity.

6. A navigation system for an automotive vehicle as claimed in claim 5, wherein the storing section stores an average velocity conversion table prescribing calculation equations to be applied to a calculation of the interval travel distance by the distance calculating section in accordance with the average velocity and the distance calculating section refers to the average velocity conversion table to apply one of the calculation equations to the calculation of the interval travel distance in accordance with the average velocity.

7. A navigation system for an automotive vehicle as claimed in claim 2, wherein the travel history includes an information related to a kind of road for each of the road intervals through which the vehicle has traveled and the distance calculating section calculates the interval travel distance in accordance with the kind of road.

8. A navigation system for an automotive vehicle as claimed in claim 7, wherein the storing section stores a road kind conversion table prescribing calculation equations to be applied to a calculation of the interval travel distance in accordance with the kind of the road constituted by the one of the road intervals and wherein the distance calculating section refers to the road kind conversion table to apply one of the calculation equations to the calculation of the interval travel distance in accordance with the kind of the road.

9. A navigation system for an automotive vehicle as claimed in claim 2, wherein the travel history includes an information related to a stopped number of times that the vehicle has stopped for each of the road intervals through which the vehicle has traveled and wherein the distance calculating section calculates the interval travel distance in accordance with the stopped number of times the vehicle has stopped.

10. A navigation system for an automotive vehicle as claimed in claim 9, wherein the storing section stores a stopped number of times conversion table prescribing calculation equations to be applied to a calculation of the interval travel distance in accordance with the stopped number of times and wherein the distance calculating section refers to the stopped number of times conversion table to apply one of the calculation equations to the calculation of the interval travel distance in accordance with the stopped number of times.

11. A navigation system for an automotive vehicle as claimed in claim 2, wherein any of the road intervals in the one of the predetermined regions which have a common characteristic of at least one of a position, a direction, and a distance to each other from among the road intervals included in the travel history and road map information are grouped into a common interval group, the respective road intervals belonging to the common interval group being divided into a representative road interval and other general road intervals which are replaceable with this representative road interval and each general road interval being made correspondent with the representative road interval, the distance calculating section comprises a determining section that determines that the vehicle has traveled one of the representative road intervals which is made correspondent to one of the general road intervals through which the vehicle has actually traveled when the vehicle has actually traveled through the one of the general road intervals and the distance calculating section calculates a representative road interval travel distance on the basis of the information on the representative road interval in place of the interval travel distance, the distance accumulating section calculates the regional travel distance for each of the common interval groups in which the one of the road intervals is included, and the familiarity degree calculating section calculates the ratio of the representative interval travel distance to the whole length of the representative road interval, and the familiarity degree calculating section retrieves the whole length of the representative road interval which is a total sum of the distances of the representative road intervals included in the respective common interval groups derived on the basis of the road map information.

12. A navigation system for an automotive vehicle as claimed in claim 2, wherein the road map information is stored to be made correspondent with a search condition including a name of the one of the predetermined regions, the information producing section comprises: a search section that searches for the road map information corresponding to the search condition on the basis of the search condition inputted by a user; and a search condition updating section that adds the name of the one of the predetermined regions in a form of an independent search condition of the road map information to update the road map information when the degree of familiarity of the predetermined region calculated by familiarity degree calculating section is in excess of a predetermined value.

13. A navigation system for an automotive vehicle as claimed in claim 2, wherein the road map information comprises an information related to a class of the road for each of the road intervals, the information producing section comprises a search section that accepts a search condition related to an object of a search from a user of the vehicle and searches the information related to the object positioned along any one of the road intervals, and the search section searches the information related to the object excluding the object which is positioned along a low class road in the road map information from the object of the search when the object belongs to the predetermined region having the degree of familiarity which is lower than a predetermined degree of familiarity.

14. A navigation system for an automotive vehicle, comprising:
a storing section that stores therein a travel history of the vehicle for each of users of the vehicle which is made correspondent with a road map information;
a calculating section that calculates a degree of familiarity of one of the users with one of predetermined regions for each of the predetermined regions in the road map information on the basis of the travel history of the one of the users of the vehicle and its corresponding road map information; and
an information producing section that produces the road map information in accordance with the degree of familiarity of the one of the users of the vehicle with the one of the predetermined regions calculated by the calculating section.

15. A navigation method for an automotive vehicle, comprising:
storing a travel history of the vehicle which is made correspondent with a road map information;
calculating a degree of familiarity with one of predetermined regions for each of the predetermined regions in the roadmap information on the basis of the travel history of the vehicle and its corresponding road map information; and
producing the road map information in accordance with the degree of familiarity with the one of the predetermined regions calculated by the calculating section.

16. A navigation method for an automotive vehicle as claimed in claim 15, wherein, when storing the travel history, the travel history for each of a plurality of road intervals into which a road included in the one of the predetermined regions of the road map information is partitioned by a predetermined interval is stored and wherein, when calculating the degree of familiarity, an interval travel distance by which the vehicle has traveled for each of the road intervals is calculated on the basis of the travel history and the road map information, the calculated interval travel distance for each of the predetermined regions in which the corresponding road interval is included is accumulated to calculate a regional travel distance for each of the predetermined regions, a whole road length of a total sum of distances of the road included in the one of the predetermined regions determined on the basis of the road map information is retrieved, and a ratio of the regional travel distance to the whole road length is calculated to derive the degree of familiarity with the one of the predetermined regions for each of the predetermined regions.

17. A navigation program for an automotive vehicle, comprising:
a storing function to store a travel history of the vehicle which is made correspondent with a road map information;
a calculating function to calculate a degree of familiarity with one of predetermined regions for each of the predetermined regions in the road map information on the basis of the travel history of the vehicle and its corresponding road map information; and
an information producing function to produce the road map information in accordance with the degree of familiarity with the one of the predetermined regions calculated by the calculating section.

18. A navigation system for an automotive vehicle, comprising:
storing means for storing therein a travel history of the vehicle which is made correspondent with a road map information;
calculating means for calculating a degree of familiarity with one of predetermined regions for each of the predetermined regions in the road map information on the basis of the travel history of the vehicle and its corresponding road map information; and
information producing means for producing the road map information in accordance with the degree of familiarity with the one of the predetermined regions calculated by the calculating means.

* * * * *